United States Patent [19]

Handtmann

[11] Patent Number: 4,587,842
[45] Date of Patent: May 13, 1986

[54] ARRANGEMENT FOR MEASURING THE MASS FLOW-RATE OF A FLOWING MEDIUM

[75] Inventor: Dieter Handtmann, Sindelfingen, Fed. Rep. of Germany

[73] Assignee: Robert Bosch GmbH, Stuttgart, Fed. Rep. of Germany

[21] Appl. No.: 553,643

[22] Filed: Nov. 21, 1983

[30] Foreign Application Priority Data

Dec. 30, 1982 [DE] Fed. Rep. of Germany ....... 3248603

[51] Int. Cl.$^4$ .............................................. G01F 1/68
[52] U.S. Cl. ...................................................... 73/204
[58] Field of Search ................................... 73/204, 118

[56] References Cited

U.S. PATENT DOCUMENTS

| | | | |
|---|---|---|---|
| 3,429,178 | 2/1969 | Durbin | 73/204 |
| 3,603,147 | 9/1971 | Dorman | 73/204 |
| 3,747,577 | 7/1973 | Mauch | |
| 4,043,195 | 8/1977 | Hunting | 73/204 |
| 4,043,196 | 8/1977 | Trageser | 73/204 |
| 4,083,244 | 4/1978 | Agar et al. | 73/204 |
| 4,283,944 | 8/1981 | Gruner et al. | |
| 4,344,322 | 8/1982 | Plapp | 73/204 |
| 4,468,963 | 9/1984 | Schauble | 73/118 |

FOREIGN PATENT DOCUMENTS

2209413 11/1976 Fed. Rep. of Germany .

Primary Examiner—Herbert Goldstein
Attorney, Agent, or Firm—Walter Ottesen

[57] ABSTRACT

The invention is directed to an arrangement for determining the mass rate of flow of a flowing medium, especially the mass rate of flow of air required in the combustion process of an internal combustion engine. The arrangement of the invention includes at least two temperature-dependent resistors which are placed directly in the flowing medium. The arrangement further includes two actively operated bridge connected to respective operational amplifiers. By means of a simple arithmetic coupling of the values of both bridge currents, an output signal is obtained which uniquely serves as an indication of the mass rate of flow and is independent of the temperature of the flowing medium. The condition that the two temperature-dependent resistors are operated at constant temperature independently of the temperature of the flowing medium permits further improvements to be realized. More specifically, the two temperature-dependent resistors can be configured as film resistors on a massive substrate without any loss in the speed of response. By utilizing two temperature-dependent resistors in a single bridge, an improved sensitivity of the arrangement can be obtained and an indication of the direction of flow of the medium can be achieved.

14 Claims, 9 Drawing Figures

ARRANGEMENT FOR MEASURING THE MASS FLOW-RATE OF A FLOWING MEDIUM

FIELD OF THE INVENTION

The invention relates to an arrangement for determining the mass flow-rate of a flowing medium, especially the mass flow-rate of air needed by an internal combustion engine in the combustion process.

BACKGROUND OF THE INVENTION

Such arrangements have been known for some time and are exemplified by that shown in U.S. Pat. No. 3,747,577. In this publication, an apparatus is disclosed wherein two temperature-dependent resistors are arranged in different branches of a measuring bridge. The bridge is configured so that the one temperature-dependent resistor is heated to a high temperature above the temperature of that of the flowing medium because of the large current flowing therethrough. The measuring principle of this arrangement is based on the fact that the medium which flows past the resistor draws a predetermined quantity of heat away therefrom dependent upon the velocity and density of the flow. The second temperature-dependent resistor serves to compensate for the influence of the varying temperature of the flowing medium. In addition, the current flowing through this temperature-dependent resistor is selected to be so small that the temperature of the resistor is determined exclusively by the temperature of the flowing medium.

The current flowing through the bridge is controlled with the aid of a regulating device such that the heated temperature-dependent resistor exhibits a constant temperature difference with reference to the temperature of the inducted air. The current flowing through the bridge can, for example, be used as a measure for the mass per unit of time flowing past this resistor. In order to insure a fast response of the arrangement to changes in flow, the heated resistor is configured in the form of a resistor with a small thermal time constant such as a hot wire, for example. The temperature-dependent compensating resistor has resistance values which are several orders of magnitude larger than the resistance value of the hot wire. This temperature-dependent compensation resistor has a substantially larger thermal time constant because of its geometric form and its larger mass.

With this arrangement, there is the problem and disadvantage that the fast temperature changes of the flowing medium cause the arrangement to provide false measured values until the temperature of the compensation resistor is again in balance with the temperature of the flowing medium. Furthermore, under certain circumstances, as for example when the flowing medium is contaminated with solid particles, it is desirable to replace the heated temperature-dependent resistor with a resistor that is robust, the former being mechanically very sensitive because of its low mass. In this arrangement wherein the temperature of the hot wire follows the temperature of the flowing medium, the use of a massive resistor would be a great disadvantage because of a substantial reduction in the speed of response. Furthermore, because of the special dimensioning of the bridge resistors required by various peripheral conditions, only a limited use of the available heat capacity is made of which only about thirty percent is utilized for heating the hot wire. In addition, there is the necessity to increase the sensitivity of the arrangement in order to meet the growing demands on measuring accuracy of such an arrangement.

There are further developments and improvements of this type arrangement known which avoid several of the disadvantages delineated above; however, these developments create new problems and other disadvantages. In U.S. Pat. No. 4,344,322, for example, an arrangement for measuring the mass flow-rate of air in the air induction tube of an internal combustion engine is disclosed wherein both temperature-dependent resistors are configured as hot wires. For both hot wires, a temperature above the temperature of the inducted air is selected and the difference of the hot wire temperatures is held to a constant value. This arrangement has the advantage that the thermal time constants of both temperature-dependent resistors of like configuration have the same values so that temperature variations of the flowing medium cause no measuring errors based on differences in the speed of response of the resistors. However, to prevent a dependence of the measuring signal on the temperature of the flowing medium, it is necessary to place the temperature coefficients of both the total resistances of the bridge branches in a very definite relationship, the temperature-dependent resistors being arranged in the branches. This requirement can be fulfilled especially in a mass production of this arrangement only with moderate precision or with a very considerable engineering effort.

Also in these arrangements wherein only the difference of the hot wire temperatures has to be maintained at a constant value, a massive mechanically insensitive embodiment of the temperature-dependent resistors would lead to a larger response time of the bridge.

A further arrangement for measuring the mass flow rate of a flowing medium is disclosed in U.S. Pat. No. 4,283,944. In this arrangement, a temperature-dependent film resistor formed on a substrate is utilized in lieu of a hot wire. There is a flow of heat flowing between the film resistor and the substrate which leads to a reduction of the response speed of the film resistor. In order to keep this flow of heat at zero or limited to only a very low value, a further active regulated bridge circuit is needed in addition to the first active bridge for regulating the temperature of the film resistor. This bridge circuit acts exclusively to heat the substrate to the same value approximating the temperature of the film resistor. With this measure, one does provide that the temperature-dependent measuring resistor configured as a film resistor on a substrate exhibits a fast time response action which is similar to that of a hot wire; however, all the other disadvantages already mentioned above remain notwithstanding the very substantial increase in the complexity of the circuit.

Finally, it is appropriate to mention certain measures which lead to an increase in the sensitivity of the bridge circuits. Accordingly, the Wheatstone bridges utilized in the described arrangements reach their maximum selectivity when the bridge resistors of each bridge branch have the same value or, more specifically, when the bridge is symmetrical. A further doubling of the sensitivity can be obtained when two measuring resistors are utilized in mutually adjacent branches of the bridge in lieu of one measuring resistor.

SUMMARY OF THE INVENTION

It is an object of the invention to provide an arrangement for determining the mass flow-rate of a flowing medium, especially of the flow-rate of the mass of air needed in an internal combustion engine during the combustion process.

The arrangement of the invention includes first resistance measuring circuit means incorporating a first temperature-dependent resistor for supplying current thereto to heat the same to a first predetermined temperature. The first temperature-dependent resistor is disposed in the flowing medium whereby changes in the heat transferred thereto from the first resistor cause the first resistance measuring circuit means to become unbalanced. Second resistance measuring circuit means incorporates a second temperature-dependent resistor for supplying current thereto to heat the same to a second predetermined temperature different from the first temperature. The second temperature-dependent resistor is disposed in the flowing medium whereby changes in the heat transferred thereto from the second resistor cause the second resistance measuring circuit means to become unbalanced. Adjusting circuit means adjust the currents in response to changes in the heat transferred to the medium to thereby heat the resistors to maintain the respective temperatures constant and to thereby rebalance the resistance measuring circuits. The heats transferred and the currents are a function of the mass rate of flow of the medium and of the temperature thereof. Signal circuit means provide terminals at which respective signals indicative of said currents can be monitored.

The arrangement of the invention avoids the disadvantages of the prior art referred to above by making use of a constant-temperature double bridge.

According to a further feature of the invention, signal processing circuit means receives the signals indicative of the above-mentioned currents for processing the same to eliminate the influence of the temperature of the medium thereon to thereby provide an output quantity indicative of the mass rate of flow of the medium.

In applying the arrangement of the invention, it has been shown to be advantageous that the temperature coefficients of both temperature-dependent resistors do not have to be adjusted with respect to each other and their respective values can vary.

Further advantages of the arrangement according to the invention are obtained especially from the changed method of operation of the temperature-dependent resistors which are each heated to a constant temperature value by means of a regulator circuit independent of the temperature of the inducted air and the quantity of inducted air. The speed of response of this arrangement is not reduced by the thermal time constants of the temperature-dependent resistors when the temperature of the air changes since the thermal time constants are not part of the measuring result; this condition is present because the temperature-dependent resistors are at a constant operating temperature.

For this reason, the utilization of resistors with a small thermal time constants such as hot wires is not required so that resistors which are mechanically insensitive such as film resistors can be utilized. Also, all other bridge resistors can be configured as film resistors so that the entire bridge can be manufactured pursuant to a single technology. An especially advantageous configuration of the bridge is wherein all four bridge resistors are formed on a common substrate.

By avoiding the use of hot wires as temperature-dependent resistors, a larger freedom of design in the bridges is achieved because certain peripheral conditions no longer obtain. The bridge can now be configured as a symmetrical bridge and this leads to further advantages of the arrangement according to the invention. In addition to an increase in the sensitivity, the available heat power can be optimally utilized by a suitable arrangement of the bridge resistors. The temperature-dependent measuring resistors can be framed by or packaged within the other bridge resistors at which the same heat power occurs so that the temperature profile at the measuring resistor has an even characteristic. With this arrangement wherein the bridge resistors are preferably configured as hot film resistors, a flow of heat from temperature-dependent resistors to the substrate is prevented and thereby a very high response time is obtained.

The fact that in each bridge of the arrangement of the invention, only one bridge branch has a temperature-dependent resistor permits a further increase of the sensitivity of the bridge as well as a means for recognizing the direction of flow of the flowing medium.

BRIEF DESCRIPTION OF THE DRAWING

The invention will now be described with reference to the drawing wherein.

DESCRIPTION OF THE PREFERRED EMBODIMENTS OF THE INVENTION

Figure 1:
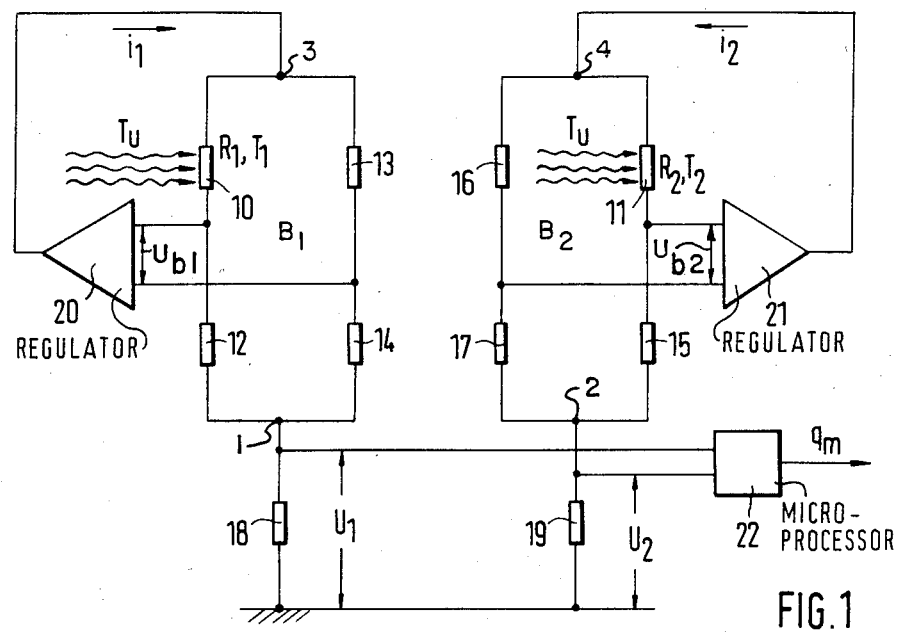
FIG. 1 is a schematic of an arrangement for measuring mass rate of flow of a flowing medium according to a first embodiment of the invention incorporating a signal processing unit in the form of a microprocessor for evaluating the bridge signals.

Referring to FIG. 1, the resistors $R_1$ and $R_2$ are designated by reference numerals 10 and 11 respectively. Resistors 10 and 11 are heated to temperatures $T_1$ and $T_2$ and are arranged in respective bridge circuits $B_1$ and $B_2$. Each bridge circuit is completed by means of three further resistors which are not dependent upon temperature. The bridge branches of the two identically-configured individual bridges $B_1$ and $B_2$ of the double-bridge arrangement are made up of the respective series circuit paths including: resistors 10 and 12; resistors 13 and 14, as well as resistors 11 and 15; and resistors 16 and 17. The bottom circuit nodes 1 and 2 of the bridges are connected to ground via respective resistors 18 and 19. The outputs of the regulators 20 and 21 are connected to respective bridge circuit nodes 3 and 4. The regulators are configured as differential amplifiers and the respective bridge output voltages $U_{b1}$ and $U_{b2}$ are applied to the inputs of the regulators. The circuit nodes 1 and 2 and the signal leads connected to the microprocessor 22 define signal circuit means at which voltages $U_1$ and $U_2$ are provided. These voltages are the voltage drops across respective resistors 18 and 19. The arrangement is completed by means of the microprocessor 22 which is connected to circuit nodes 1 and 2 and to which are applied respective inputs $U_1$ and $U_2$. The output $q_m$ of the microprocessor has a magnitude which is proportional to the mass flow-rate of the flowing medium.

The operation of this arrangement of the invention will now be described.

The resistors 10 and 11 are arranged in the flowing medium having a temperature $T_u$. The flowing medium can, for example, be the air required by an internal combustion engine during the combustion process. The currents $i_1$ and $i_2$ flow in respective bridges $B_1$ and $B_2$ and heat the temperature-dependent resistors 10 and 11 to temperatures $T_1$ and $T_2$, respectively. For the balanced condition, the currents $i_1$ and $i_2$ adjust so that the respective bridge output voltages $U_{b1}$ and $U_{b2}$ are zero. If the mass of the flowing air changes per unit of time, the bridges become unbalanced until the regulators 20 and 21 change the respective bridge currents so that the resistors 10 and 11 again are at the temperatures $T_1$ and $T_2$. This regulating process is initiated also when the mass of the flowing medium per unit of time is constant, but the temperature $T_u$ thereof varies. The voltages $U_1$ and $U_2$ fed to the microprocessor 22 are indicative of the total currents $i_1$ and $i_2$ flowing through the respective bridges $B_1$ and $B_2$ and vary as a function of the mass per unit of time and as a function of the temperature $T_u$ of the flowing medium.

The following short computation will show that the influence of the temperature of the flowing medium when using the arrangement of the invention can be eliminated by means of a simple arithmetical manipulation of the values of the two bridge currents. First, the following quantities will be defined:

$T_1$ = temperature of the temperature-dependent resistor 10

$T_2$ = temperature of the temperature-dependent resistor 11

$i_1$ = bridge current of bridge $B_1$ $i_2$ = bridge current of bridge $B_2$ $q_m$ = mass rate of flow $\Delta T_1 = T_1 - T_u$ $\Delta T_2 = T_2 - T_u$ $C_1$ = constant With the quantities defined above, the following represents the approximate functional dependence of the respective bridge currents $i_1$ and $i_2$ on $q_m$, $\Delta T_1$ and $\Delta T_2$:

$$(i_1)^2 = C_1 \cdot \sqrt{q_m} \cdot \Delta T_1$$

$$(i_2)^2 = C_1 \cdot \sqrt{q_m} \cdot \Delta T_2$$

By forming the difference of these expressions, a magnitude is obtained which is independent of the temperature $T_u$ of the flowing medium:

$$(i_1)^2 - (i_2)^2 = C_1 \cdot \sqrt{q_m} \cdot (T_1 - T_2)$$

Solving for the desired quantity $q_m$ yields the following expression:

$$q_m = C_4 \cdot [(U_1)^2 - (U_2)^2]^2$$

wherein $C_4$ is an apparatus constant which is dependent upon the following: temperatures $T_1$ and $T_2$; the resistance values of the resistors 18 and 19; and, the physical parameters of the film resistors 10 and 11 and of the flowing medium.

By suitable processing of the bridge currents $i_1$ and $i_2$ or the voltages $U_1$ and $U_2$ proportional thereto, for example, by a microprocessor 22, a determination of the mass flow rate of the flowing medium can be determined independently of the temperature $T_u$ thereof.

Figure 2:
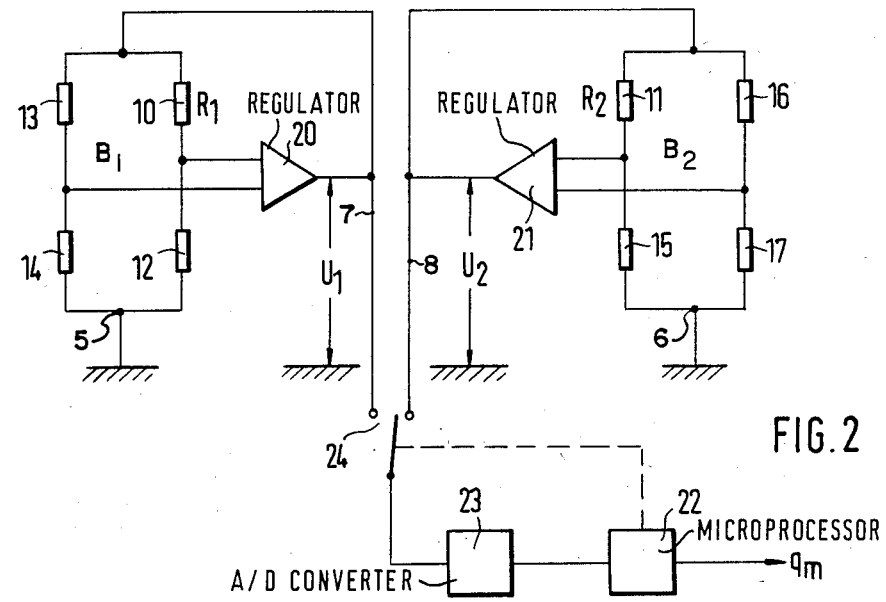
FIG. 2 is a schematic of an arrangement for measuring the mass flow-rate of a flowing medium according to a second embodiment of the invention incorporating a control unit that includes an analog-to-digital converter in cascade with a microprocessor.

A further embodiment of the arrangement equipped with a signal processing unit for evaluating the bridge signals is shown in FIG. 2. The circuit arrangement of the bridges per se as well as the regulators differentiate from the circuit of FIG. 1 only in that the lower circuit nodes 5 and 6 of the respective bridges are connected directly to ground. In this embodiment, the output voltages $U_1$ and $U_2$ of the respective regulators 20 and 21 serve as an index for the respective bridge currents $i_1$, $i_2$ and are transmitted along signal circuit means in the form of signal leads 7 and 8. These output voltage signals are fed to a microprocessor 22 via an analog-to-digital converter 23. A switch 24 alternately applies the output voltages $U_1$ and $U_2$ to the converter 23 and the microprocessor 22 computes the desired output quantity $q_m$ from the voltages $U_1$ and $U_2$.

Figure 3:
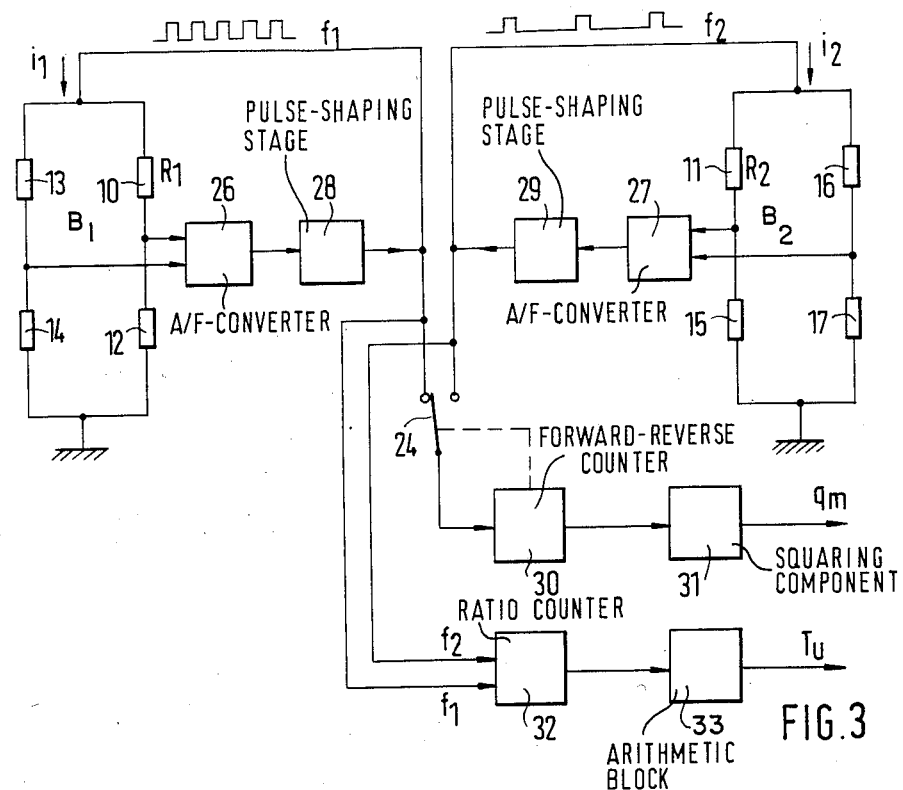
FIG. 3 is a schematic of an arrangement for measuring the mass flow-rate according to a third embodiment of the invention wherein separate signal processing units provide respective outputs indicative of the mass rate of flow and the temperature of the flowing medium.

A further embodiment of the circuit for evaluating the bridge signals is shown in FIG. 3. In this embodiment, the bridge circuits are identical with those shown in FIG. 2. Here, amplitude-frequency converters 26 and 27 with respective pulse shaping stages 28 and 29 connected in cascade therewith are utilized as regulators. The regulating circuit is configured so that the output voltages of the bridge circuits $B_1$ and $B_2$ are converted by the amplitude-frequency converters 26 and 27 into respective frequencies proportional to said output voltages. The pulse shapers 28 and 29 form pulses of constant amplitude and duration from this frequency so that the temperature-dependent resistors 10 and 11 are heated with the aid of pulses of constant energy value. The frequencies $f_1$ and $f_2$ of the pulses occurring at the respective outputs of the pulse shaping stages 28 and 29 are in this way directly proportional to the heating powers which depend upon the respective quantities $(i_1)^2$ and $(i_2)^2$. In this way, a squaring is avoided which would otherwise require a complicated circuit arrangement so that in the instant embodiment, a forward-reverse counter 30 forms the quantity $[(i_1)^2-(i_2)^2]$ as a difference of the frequencies $(f_1-f_2)$. A squaring component 31 to which this signal is fed delivers the desired output quantity $q_m$.

Further, the apparatus according to FIG. 3 enables the temperature $T_u$ of the flowing medium to be determined in a simple manner. A ratio counter 32 to which the frequencies $f_2$ and $f_1$ are supplied as input quantities forms the ratio S of these frequencies. With the apparatus constant, $A=T_2/T_1$, the ratio of the intake air temperature $T_u$ to the temperature $T_1$ of the temperature-dependent resistor 10 is defined as follows:

$$T_u/T_1 = \frac{A - S}{1 - S}$$

By means of a simple arithmetical transformation, the temperature of a flowing medium, such as the temperature $T_u$ of the intake air in an internal combustion engine, can be computed in the arithmetic block 33. The arithmetic block 33 computes the quantity $T_u$ by performing the operation:

$$\frac{(A - S)}{(1 - S)} \cdot T_1$$

The temperature $T_u$ can be used as a correcting quantity for various control and regulating mechanisms.

Figure 4:
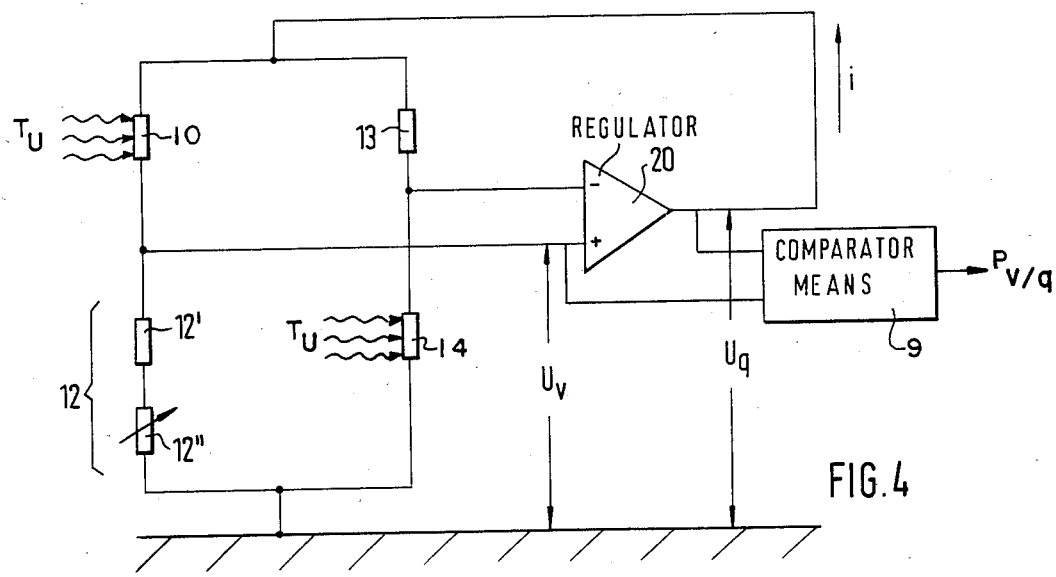
FIG. 4 is an embodiment of an individual bridge of increased sensitivity capable of detecting the direction of flow of a flowing medium.

FIG. 4 is an embodiment of a single bridge wherein the output signal thereof is compensated by means of a further device (not shown in FIG. 4) with respect to the temperature of the flowing medium. This individual bridge is especially applicable as a component of the constant temperature double bridges disclosed in the previous embodiments. The basic arrangement of the bridge comprising the resistors 10, 12, 13 and 14, as well as the regulator 20, corresponds to one of the two bridge circuits of FIG. 2.

In contrast to the bridge of FIG. 2, the resistor 14 of FIG. 4 has a large temperature coefficient as does the resistor 10 and both resistors 10 and 14 are subjected to the flowing medium. The two resistors 13 and 12 are not dependent upon temperature. Of the two resistors 13 and 12, resistance 12 is divided into two resistors 12' and 12" whereby the resistance 12" serves to calibrate the bridge. By configuring the resistance 14 as a further temperature-dependent measuring resistor, the sensitivity of the bridge can be increased on the one hand and, on the other hand, the precondition is achieved for obtaining an arrangement for determining the direction of flow by means of a suitable geometric arrangement of the resistors.

By means of special embodiments of the bridge resistors described below, it is possible to provide for the condition that the operating temperature on resistor 14 becomes slightly lower and the operating temperature on resistor 10 becomes slightly higher for a definite direction of flow of the medium. With this condition, a displacement in the direction of lower values is achieved provided that the precondition of temperature coefficients of the same sense are provided at the plus and minus inputs of the regulator 20. For the opposite condition namely, by a reversal of the direction of flow, an increase in both voltages occurs in the same direction. From the voltage ratio of the voltage $U_v$ at the plus input and $U_q$ at the output of the regulator 20, an indication of the direction of flow of the medium is obtained. Especially when using a symmetrical bridge wherein all resistors 10, 12, 13 and 14 take on the same value, the indication of the direction of flow is determined from the interrogation of whether the voltage ratio $U_v/U_q$ is larger or smaller than 0.5. This ratio can be evaluated by suitable comparator means 9 to provide an output quantity $P_{v/q}$ indicative of the direction of flow.

From the utilization of these constant-temperature bridges, it is possible to use larger and more massive resistors without reducing the speed of the response of these bridges. Such massive resistors are temperature-dependent measuring resistors and can be coil resistors or film resistors deposited on a substrate. Since the measuring resistors in this circuit arrangement are not caused to follow the temperature of the flowing medium, it is only necessary that the heat flow between the resistor and its carrier be prevented. In this case, these relatively voluminous resistors have thermal time constants of the same order of magnitude or larger than such measuring resistors, for example, hot wires with very small mass which are trimmed to high response speeds. Furthermore, the advantages of a large mechanical insensitivity, a possible high operating temperature and a configuration of the bridge made pursuant to a unitary technology are obtained.

Figure 5:
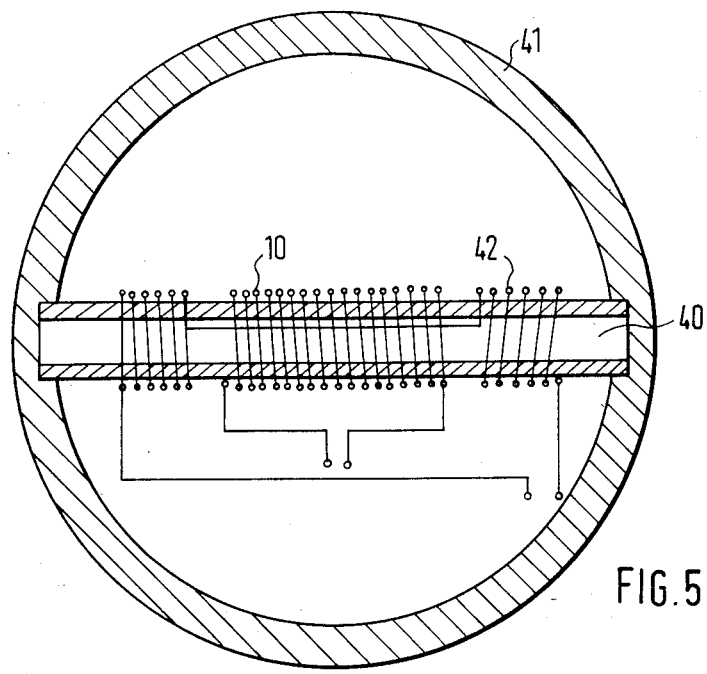
FIG. 5 is a schematic of an embodiment of the temperature-dependent resistor arranged in an air intake tube of an internal combustion engine.

FIG. 5 is an embodiment of the temperature-dependent resistor 10 wherein the latter is arranged on a massive carrier 40 which is fixedly mounted in the air induction tube 41. The resistor 10 is configured as a hot wire and is wound with many turns upon the massive carrier 40. A heat protective heating element 42 is arranged at both ends of the resistor 10 to prevent a temperature drop therealong. The heater 42 is controlled to the same temperature as the measuring resistor 10. In this way, a heat transfer from the resistor 10 to the carrier 40 is very substantially prevented and a fast response characteristic of the measuring resistance 10 is guaranteed notwithstanding the large mass. The second temperature-dependent measuring resistor 11 of the other bridge can, for example, be arranged on a second identical carrier arranged upstream and transverse to the first carrier in the air induction tube 41. The second carrier can be regulated to maintain the temperature thereof at $T_2$.

Figure 6A:
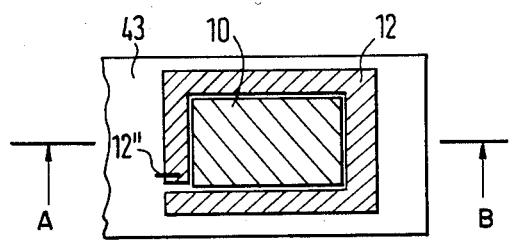
FIG. 6A is a plan view of an embodiment of a bridge circuit including a temperature-dependent resistor arranged on a substrate.
Figure 6B:
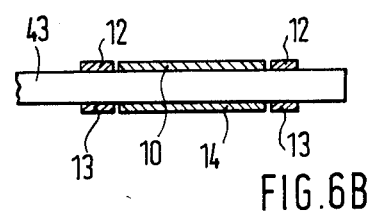
FIG. 6B is an elevation view, partially in section, of the resistor of FIG. 6A taken along line A-B.

A further embodiment of the arrangement of a temperature-dependent measuring resistor is shown in FIGS. 6A and 6B. FIG. 6A is a plan view of the resistance arrangement and reference numeral 43 identifies the substrate. The temperature-dependent measuring resistor 10 is applied to this substrate, for example, in the form of a rectangular film resistor. To support the heat capacity of the resistor 10, a resistor 12 is applied to the substrate as a film resistor and entirely frames the resistor 10 about its periphery. This geometrical arrangement of resistors is especially advantageous if the resistors have the same resistance value and exhibit approximately the same heat capacity per unit of surface area. On the one hand, the heat capacity developed by this bridge branch is used primarily for heating the resistor 10 which is not the case in known arrangements and, on the other hand, the special arrangement of the resistor 12 guarantees an even temperature profile over the entire surface of resistor 10. The resistor for calibrating the bridge is designated by reference numeral 12" in FIG. 4 and is not shown as a separate resistor in the embodiment of FIG. 6A since it is here possible to adjust the resistance 12 to the desired value by using a laser.

FIG. 6B is an elevation view, partially in section, of the substrate of FIG. 6A wherein both resistors 13 and 14 of the bridge are also shown applied to the substrate 43. With respect to a geometrical form, resistor 14 is configured the same as resistor 10 and resistor 13 the same as resistor 12. The bridge circuit path consisting of resistors 14 and 13 is applied to the lower side of the substrate; whereas, the other bridge circuit path consisting of resistors 10 and 12 is applied to the upper side of the substrate. The advantage of this arrangement is that all bridge resistors are manufactured pursuant to one technology and a compact arrangement wherein all resistors are applied to a single substrate is provided.

Figure 7:
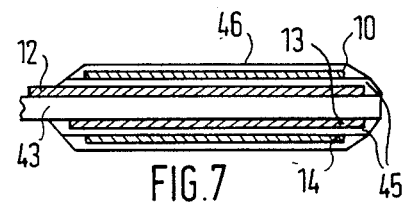
FIG. 7 is an elevation view, partially in section, of another embodiment of a bridge circuit including a temperature-dependent resistor formed on a substrate; and, FIG. 8 shows how the bridge circuits of FIGS. 6A, 6B, and 7 can be arranged within the air induction tube of an internal combustion engine to facilitate detecting the direction of flow of the air.

A still further embodiment of the arrangement of the bridge resistors on a substrate is shown in FIG. 7. In this embodiment, the resistors 12 and 13 are configured as film resistors, for example, and cover the entire surface of the substrate 43, namely, the upper and lower surfaces thereof, respectively. The temperature-dependent measuring resistors 10 and 14 are arranged on top of these respective resistors 12 and 13 and are separated by means of an isolation layer 45. To protect against mechanical damage, all resistors including the substrate plate are surrounded by a protective layer 46. In this embodiment, too, the heat capacity of resistors 12 and 13 can be utilized to thermally isolate the measuring resistors 10 and 14 from the substrate 43, especially when used as a symmetrical bridge. In this way, a high response speed of the temperature-dependent resistors 10 and 14 is assured.

Figure 8:
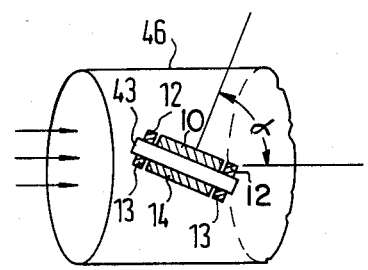

A possible arrangement of the bridge is shown in FIG. 8. Here, the bridge can be configured as shown in FIGS. 6A, 6B or FIG. 7 and is placed in a flowing medium, for example, the flowing air mass in an air intake tube 46. The substrate 43 with its film resistors 10, 12, 13 and 14 arranged thereon is inclined slightly to the direction of flow in the intake tube 46, the direction of flow being shown by arrows F. In the steady-state condition, a so-called wind-shadow effect occurs wherein a slight increase in the operating temperature of resistor 10 and a slight decrease in the operating temperature of resistor 14 occurs. As already described with respect to the embodiment of FIG. 4, the sense of the direction of flow is determined by a comparison of the total bridge voltage $U_q$ and the voltage drop $U_v$ across the resistor 12. By reversal of the direction of flow, precisely the opposite effect is obtained, namely, that the temperature of resistor 10 is lowered and the temperature on resistor 14 is increased thereby causing a change of this voltage relationship.

With the arrangement of the invention wherein a constant-temperature type double bridge is utilized to determine the mass rate of flow of a flowing medium, the influence of temperature of the flowing medium on the measuring result is eliminated in an ideal manner. By purposefully pursuing this principle of the constant-temperature bridge in combination with means for compensating for temperature of a flowing medium, further very advantageous embodiments and improvements of the known arrangement is achieved. In this manner, the measuring resistance which has conventionally been in the form of a hot wire may be replaced with an arrangement which has greater mechanical stability without reducing the speed of response of the measuring resistor. By configuring the bridge as a symmetrical bridge and introducing a second temperature-dependent resistor, the bridge sensitivity is substantially improved. Furthermore, with various embodiments of this bridge, the sense of the direction of flow of the medium can be determined.

It is understood that the foregoing description is that of the preferred embodiments of the invention and that various changes and modifications may be made thereto without departing from the spirit and scope of the invention as defined in the appended claims.

What is claimed is:

1. An arrangement for determining the mass rate of flow of a flowing medium such as the mass rate of flow of air required by an internal combustion engine during the combustion process, the arrangement comprising:

first balancing circuit means incorporating a first temperature-dependent resistor for supplying current thereto to heat the same to a first predetermined temperature;

said first temperature-dependent resistor being disposed in the flowing medium whereby changes in the heat transferred thereto from said first resistor causes said first balancing circuit means to become unbalanced;

second balancing circuit means incorporating a second temperature-dependent resistor for supplying current thereto to heat the same to a second predetermined temperature different from said first temperature;

said second temperature-dependent resistor being disposed in the flowing medium whereby changes in the heat transferred thereto from said second resistor causes said second balancing circuit means to become unbalanced;

adjusting circuit means for adjusting said currents in response to changes in the heat transferred to the medium to thereby heat said resistors to maintain said respective temperatures constant and to thereby rebalance said balancing circuits, said heats transferred and said currents being a function of the mass rate of flow of the medium and of the temperature thereof;

signal circuit means for providing respective signals indicative of said currents;

said adjusting circuit means including: a first analog-to-digital converter connected to the output of said first balancing circuit means for converting the output voltage thereof into pulses, said first converter having an output connected to ground through said first balancing circuit means to supply said pulses thereto to heat said first resistor to maintain the same at said first temperature; and, a second analog-to-digital converter connected to the output of said second balancing circuit means for converting the output voltage thereof into pulses, said second converter having an output connected to ground through said second balancing circuit means to supply said pulses thereto to heat said second resistor to maintain the same at said second temperature; and, means for combining the pulses of said digital converters to provide a signal indicative of said mass rate of flow of said flowing medium which is independent of the temperature thereof.

2. The arrangement of claim 1, said first balancing circuit means being a first resistance bridge circuit having a branch defined by said first temperature-dependent resistor; and, said second balancing circuit means being a second resistance bridge circuit having a branch defined by said second temperature-dependent resistor.

3. An arrangement for determining the mass rate of flow of a flowing medium such as the mass rate of flow of air required by an internal combustion engine during the combustion process, the arrangement comprising:

first balancing circuit means incorporating a first temperature-dependent resistor for supplying current thereto to heat the same to a first predetermined temperature;

said first temperature-dependent resistor being disposed in the flowing medium whereby changes in the heat transferred thereto from said first resistor causes said first balancing circuit means to become unbalanced;

second balancing circuit means incorporating a second temperature-dependent resistor for supplying current thereto to heat the same to a second predetermined temperature different from said first temperature;

said second temperature-dependent resistor being disposed in the flowing medium whereby changes in the heat transferred thereto from said second resistor causes said second balancing circuit means to become unbalanced;

adjusting circuit means for adjusting said currents in response to changes in the heat transferred to the medium to thereby heat said resistors to maintain said respective temperatures constant and to thereby rebalance said balancing circuits, said heats transferred and said currents being a function of the mass rate of flow of the medium and of the temperature thereof; and, signal circuit means for providing respective signals indicative of said currents;

said adjusting circuit means including:

a first amplitude-frequency converter connected to the output of said first balancing circuit means for converting the output voltage thereof into a frequency proportional thereto;

a first pulse shaper connected to said first converter for forming output pulses of constant amplitude and duration;

said first pulse shaper being connected to ground through said first balancing circuit means to supply electric power to said first resistor to maintain the same at said first temperature; said electrical power being proportional to the repetition frequency of said pulses;

a second amplitude-frequency converter connected to the output of said second balancing circuit means for converting the output voltage thereof into a frequency proportional thereto;

a second pulse shaper connected to said second converter for forming pulses of constant amplitude and duration; and, said second pulse shaper being connected to ground through said second balancing circuit means to supply electrical power to said second resistor to maintain the same at said second temperature, said last-mentioned electrical power being proportional to the repetition frequency of said last-mentioned pulses.

4. The arrangement of claim 3, the output pulse train of said first pulse shaper having a frequency $f_1$ and the output pulse train of said second pulse shaper having a frequency $f_2$, the arrangement further comprising: signal processing circuit means connected to said first and second pulse shapers for evaluating said frequencies according to one of the following expressions:

$$(f_1 - f_2)^2 \text{ and } \frac{T_1[A - f_2/f_1]}{1 - f_2/f_1}$$

5. An arrangement for determining the mass rate of flow of a flowing medium such as the mass rate of flow of air required by an internal combustion engine during the combustion process, the arrangement comprising:

first balancing circuit means incorporating a first temperature-dependent resistor for supplying a first current thereto to heat the same to a first predetermined temperature;

said first temperature-dependent resistor being disposed in the flowing medium whereby changes in the heat transferred thereto from said first resistor causes said first balancing circuit means to become unbalanced;

second balancing circuit means incorporating a second temperature-dependent resistor for supplying a second current thereto to heat the same to a second predetermined temperature different from said first temperature;

said second temperature-dependent resistor being disposed in the flowing medium whereby changes in the heat transferred thereto from said second resistor causes said second balancing circuit means to become unbalanced;

adjusting circuit means for adjusting said currents in response to changes in the heat transferred to the medium to thereby heat said resistors to maintain said respective temperatures constant and to thereby rebalance said balancing circuits;

said heats transferred and said currents being a function of the mass rate of flow of the medium and of the temperature thereof;

signal circuit means for providing respective signals indicative of said currents;

signal processing means for combining said signals and for eliminating the influence of the temperature of the medium thereon to thereby provide an output quantity indicative of the mass rate of flow of the medium; and, switching means for alternately applying said signals to said signal processing means;

said first balancing circuit means including a first plurality of further resistors;

said adjusting circuit means including first regulator means for adjusting said first current in response to changes in the heat transferred to the medium to thereby heat said first resistor to maintain said first temperature constant and to thereby rebalance said first balancing circuit means;

said second balancing circuit means including a second plurality of further resistors;

said adjusting circuit means further including second regulator means for adjusting said second current in response to changes in the heat transferred to the medium to thereby heat said second resistor to maintain said second temperature constant and to thereby rebalance said second balancing circuit means; and, said temperature-dependent resistor in at least one of said balancing circuit means having a temperature coefficient much greater than the temperature coefficients of the resistors of said plurality of further resistors of said balancing circuit means, said plurality of further resistors being configured as film resistors.

6. The arrangement of claim 5, said first balancing circuit means being a first resistance bridge circuit having a branch defined by said first temperature-dependent resistor and remaining branches defined by corresponding ones of the resistors of said first plurality of further resistors; and, said second balancing circuit means being a second resistance bridge circuit having a branch defined by said second temperature-dependent resistor and remaining branches defined by corresponding ones of the resistors of said second plurality of further resistors.

7. An arrangement for determining the mass rate of flow of a flowing medium such as the mass rate of flow of air required by an internal combustion engine during the combustion process, the arrangement comprising:

first balancing circuit means incorporating a first temperature-dependent resistor for supplying a first current thereto to heat the same to a first predetermined temperature;

said first temperature-dependent resistor being disposed in the flowing medium whereby changes in the heat transferred thereto from said first resistor causes said first balancing circuit means to become unbalanced;

second balancing circuit means incorporating a second temperature-dependent resistor for supplying a second current thereto to heat the same to a second predetermined temperature different from said first temperature;

said second temperature-dependent resistor being disposed in the flowing medium whereby changes in the heat transferred thereto from said second resistor causes said second balancing circuit means to become unbalanced;

adjusting circuit means for adjusting said currents in response to changes in the heat transferred to the medium to thereby heat said resistors to maintain said respective temperatures constant and to thereby rebalance said balancing circuits;

said heats transferred and said currents being a function of the mass rate of flow of the medium and of the temperature thereof;

signal circuit means for providing respective signals indicative of said currents; and, signal processing means receiving signals indicative of said currents for eliminating the influence of the temperature of the medium thereon to thereby provide an output quantity indicative of the mass rate of flow of the medium;

said first balancing circuit means being a first resistance bridge circuit having a branch defined by said first temperature-dependent resistor; and, said adjusting circuit means including first regulator means for adjusting said first current in response to changes in the heat transferred to the medium to thereby heat said first resistor to maintain said first temperature constant and to thereby rebalance said first bridge circuit;

said second balancing circuit means being a second resistance bride circuit having a branch defined by said second temperature-dependent resistor; and, said adjusting circuit means further including second regulator means for adjusting said second current in response to changes in the heat transferred to the medium to thereby heat said second resistor to maintain said second temperature constant and to thereby rebalance said second bridge circuit;

said temperature-dependent resistor at least in one of said bridge circuits having a temperature coefficient much greater than the temperature coefficients of the resistors in the remaining branches of said one bridge circuit, said resistors of said remaining branches being configured as film resistors; and, the resistor in one of said remaining branches being a temperature-dependent resistor also having a large temperature coefficient.

8. The arrangement of claim 7, said one bridge circuit including a substrate, the resistors of all of the branches of said one bridge circuit being film resistors.

9. The arrangement of claim 8, said film resistors being dimensioned so as to all have the same magnitude.

10. The arrangement of claim 8, said one bridge having two circuit paths each made up of two branch resistors, the resistors of one of said circuit paths being formed on the top surface of said substrate and the other one of the paths being formed on the lower side of said substrate.

11. The arrangement of claim 10, the heat capacities per unit area of each of said film resistors being identical.

12. The arrangement of claim 11, said two resistors having said large temperature coefficients being centrally disposed on respective sides of said substrate, said other two resistors being disposed in surrounding relation to said two resistors, respectively.

13. The arrangement of claim 10 wherein the normal to the flat surface of said substrate is defined by a spatial vector and the flowing medium defining a velocity vector in the direction of flow, said substrate being arranged in the flowing medium so as to cause said vectors to conjointly define an angle $\alpha$ between $0 \leq \alpha < 90°$.

14. The arrangement of claim 13 wherein the current flowing in said circuit paths of said one bridge circuit defining a first voltage drop measured across the entire bridge and, the current flowing in one of said branches defining a second voltage drop measured across said one branch, the arrangement further comprising: comparator means for monitoring said first and second voltage drops and for evaluating the ratio of said voltage drops to provide a signal indicative of the direction of flow of the flowing medium.

* * * * *

UNITED STATES PATENT AND TRADEMARK OFFICE
CERTIFICATE OF CORRECTION

PATENT NO. : 4,587,842

DATED : May 13, 1986

INVENTOR(S) : Dieter Handtmann

It is certified that error appears in the above-identified patent and that said Letters Patent is hereby corrected as shown below:

In the Abstract, line 8: delete "bridge" and substitute -- bridges -- therefor.

In column 2, line 63: delete "selectivity" and substitute -- sensitivity -- therefor.

In column 14, line 5: delete "bride" and substitute -- bridge -- therefor.

Signed and Sealed this

Eleventh Day of November, 1986

Attest:

DONALD J. QUIGG

*Attesting Officer*    *Commissioner of Patents and Trademarks*